United States Patent
Brummett et al.

(10) Patent No.: US 11,807,565 B2
(45) Date of Patent: Nov. 7, 2023

(54) REMEDIATION OF PER- AND POLY-FLUOROALKYL SUBSTANCES IN WASTEWATER

(71) Applicants: Kenneth Brummett, Cleveland, TN (US); Jonathan Brummett, Cleveland, TN (US); Brian Bartel, Phoenix, AZ (US); Christina Harner, Charlotte, NC (US)

(72) Inventors: Kenneth Brummett, Cleveland, TN (US); Jonathan Brummett, Cleveland, TN (US); Brian Bartel, Phoenix, AZ (US); Christina Harner, Charlotte, NC (US)

( * ) Notice: Subject to any disclaimer, the term of this patent is extended or adjusted under 35 U.S.C. 154(b) by 0 days.

(21) Appl. No.: 17/836,375

(22) Filed: Jun. 9, 2022

(65) Prior Publication Data
US 2022/0411304 A1     Dec. 29, 2022

Related U.S. Application Data

(60) Provisional application No. 63/201,179, filed on Apr. 16, 2021.

(51) Int. Cl.
  *C02F 9/00*     (2023.01)
  *C02F 1/52*     (2023.01)
  (Continued)

(52) U.S. Cl.
  CPC .............. *C02F 9/00* (2013.01); *C02F 1/5236* (2013.01); *C02F 1/5263* (2013.01); *C02F 3/04* (2013.01);
  (Continued)

(58) Field of Classification Search
  CPC ........... C02F 11/12; C02F 11/10; C02F 11/04; C02F 11/13; C02F 9/00; C02F 11/00; C02F 1/5263; C02F 3/12; C02F 11/14
  (Continued)

(56) References Cited

U.S. PATENT DOCUMENTS

| | | | |
|---|---|---|---|
| 4,372,814 A | 2/1983 | Johnstone et al. | |
| 6,410,283 B1 * | 6/2002 | Rehmat | C02F 11/04 210/603 |

(Continued)

FOREIGN PATENT DOCUMENTS

| | | | |
|---|---|---|---|
| CN | 203487018 U | * | 3/2014 |
| CN | 106630051 A | | 5/2017 |

(Continued)

OTHER PUBLICATIONS

Hansen, Charley; Nurme, Steve; Low Termperature Sludge Dryer Through Dehumidification; Webinar offered Aug. 20, 2020.

*Primary Examiner* — Claire A Norris
(74) *Attorney, Agent, or Firm* — Chambliss, Bahner & Stophel, P.C.; Stephen D. Adams

(57) ABSTRACT

A method for remediating wastewater formed by water and per- and poly-fluoroalkyl substances (PFAS) using a wastewater treatment system that includes a collecting unit, a dewatering unit, a drying unit, and a baking unit. Wastewater provided to the collecting unit is dosed by adding a compound to the wastewater in an amount that is sufficient to cause the PFAS to separate from the water and to form a sludge. The sludge is dewatered with the dewatering from a first dryness level a second dryness level. The dewatered sludge is then dried in the drying unit from the first dryness level to a third dryness level. The dried sludge is then baked at a sufficiently high enough temperature that chemical bonds of at least a portion of the PFAS is destroyed.

18 Claims, 1 Drawing Sheet

(51) Int. Cl.
    *C02F 11/10*     (2006.01)
    *C02F 3/04*     (2023.01)
    *C02F 3/12*     (2023.01)
    *C02F 11/13*     (2019.01)
    *C02F 101/36*     (2006.01)

(52) U.S. Cl.
    CPC .............. *C02F 3/12* (2013.01); *C02F 11/10* (2013.01); *C02F 11/13* (2019.01); *C02F 2101/36* (2013.01); *C02F 2303/10* (2013.01)

(58) Field of Classification Search
    USPC ................................................. 210/609, 770
    See application file for complete search history.

(56) References Cited

U.S. PATENT DOCUMENTS

| | | |
|---|---|---|
| 7,384,573 B2 | 6/2008 | Brummett |
| 10,844,285 B1* | 11/2020 | Livingston .............. C02F 11/06 |
| 2015/0274565 A1 | 10/2015 | Kummer et al. |
| 2022/0227643 A1* | 7/2022 | Theodore .............. C02F 1/5236 |

FOREIGN PATENT DOCUMENTS

| | | | |
|---|---|---|---|
| CN | 108947200 A | * | 12/2018 |
| KR | 19990014376 A | | 2/1999 |

* cited by examiner

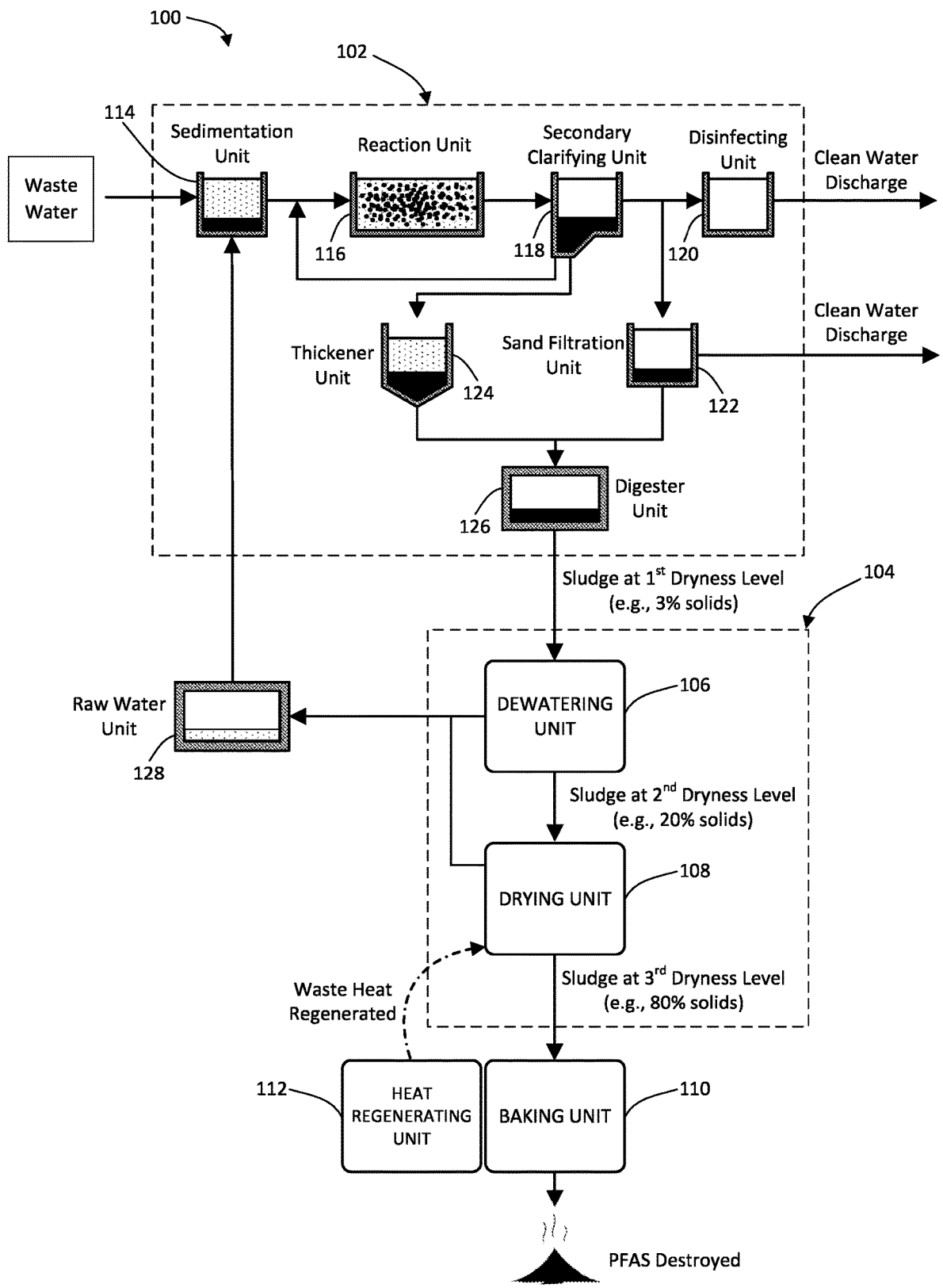

REMEDIATION OF PER- AND POLY-FLUOROALKYL SUBSTANCES IN WASTEWATER

CROSS-REFERENCE TO RELATED APPLICATIONS

This application claims the benefit of U.S. Provisional Application No. 63/201,179 filed Apr. 16, 2021, and entitled PFAS IN SITU REMEDIATION IN WATER, which is incorporated herein by reference in its entirety.

FIELD

The present invention relates to wastewater treatment methods. More particularly, the present invention relates to a method for treating wastewater having per- and poly-fluoroalkyl substances (PFAS), wherein the PFAS is destroyed and the resulting gaseous emissions rendered environmentally safe during the remediation process.

BACKGROUND

Wastewater treatment entails removing and treating many different types of pollutants or contaminants found in wastewater. Various processes are known and available in the art, but the basic approaches generally utilize biological and/or chemical treatment processes. Often, in a primary treatment step, solid components in the wastewater are removed via mechanical separation, for instance with the aid of screens and grit chambers and by allowing the solid impurities to settle in a preliminary settling device. Over the years, this primary treatment has been unable to meet the increasing demands for water quality. As a result, primary treatment is now commonly followed by a second treatment step, where the wastewater is further treated with a chemical treatment process and/or a biological treatment process. However, the second treatment step is also insufficient to meet water quality demands that continue to become more stringent and to remove certain pollutants that have been found to be dangerous to humans.

For example, per- and polyfluoroalkyl substances (PFAS) are a group of over 5,000 human-made chemicals that are manufactured for their oil and water-resistant properties. The most common PFAS are perfluorooctanoic acid (PFOA) and perfluorooctanesulfonic acid (PFOS). These chemicals are commonly found in a range of consumer products, industrial processes, etc. For example, PFAS are often found in fabrics and materials with non-stick and fire-resistant properties such as carpets and food packaging, non-stick coatings such a TEFLON® brand non-stick coatings, and fire-fighting foam.

Due to their prevalence, government agencies, such as the Environmental Protection Agency (EPA), are currently seeking to better understand PFAS, including the risks that they pose to the public. The EPA's review also includes a consideration of end-of-life disposal approaches for PFAS, including the use of landfills, incinerators, and recycling and how those approaches would impact the environment.

With respect to risks to the public, it is believed that continued exposure to PFAS above specific levels can lead to adverse health effects including cancer, liver damage, and immune system disorders. For example, it is believed that PFAS are toxic in the parts per trillion (ppt) range. Among other things, PFAS are believed to cause kidney and testicular cancer, to increase cholesterol levels, and to cause detrimental developmental effects to the immune and thyroid system and fetuses during pregnancy. In order to provide a margin of protection against the potentially harmful effects of a lifetime of exposure to PFOA and PFOS present in drinking water, the EPA has established health advisory levels at 70 parts per trillion (ppt). In other words, according to these health advisories, the combined concentration of PFOA and PFOS in drinking water should be below 70 ppt as a margin of protection against these harmful effects. Therefore, in order for PFAS-contaminated water to comply with the EPA's recommendation, the concentration of PFAS must be reduced for potable water. On the other hand, there are currently no EPA regulations or recommendations for managing PFAS in biosolids. Yet, when PFAS-containing products are produced and disposed of (e.g., land-applied biosolids), PFAS compounds can leach into soils, groundwater, and surface water, where they accumulate and persist as non-biodegradable, toxic compounds. They have also been shown to bio-accumulate or to build up in the blood and organs over time. Therefore, in waste materials (e.g., biosolids and sewage sludge/effluents), PFAS compounds should be destroyed before the waste can be safely disposed of.

With respect to end-of-life disposal, conventional wastewater treatment processes are not designed to remove and destroy PFAS. Instead, secondary filtering processes, such as granular activated carbon (GAC), reverse osmosis (RO), or ion exchange filters are commonly used to remove PFAS from water supplies. However, simply removing PFAS from water supplies does not destroy the molecules. Therefore, even after they are removed, they remain toxic. Destroying PFAS is difficult and, in fact, is often thought to be impossible. PFAS molecules are structured as chains of carbon (C) and fluorine (F) atoms with attached functional groups of oxygen (O), hydrogen (H), nitrogen (N), sulfur (S), and phosphorus (P). The carbon-fluorine bond is one of the shortest and strongest bonds in nature and does not easily break down under natural conditions. Consequently, PFAS are sometimes referred to as "forever chemicals."

Therefore, what is needed is an improved method for removing and then destroying PFAS compounds in the wastewater remediation process.

NOTES ON CONSTRUCTION

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY

The above and other problems are addressed by a method for remediating wastewater formed by water and per- and poly-fluoroalkyl substances (PFAS) using a wastewater treatment system. In preferred embodiments, the method includes the step of providing a wastewater treatment system having a collecting unit, a dewatering unit, a drying unit, and a baking unit. Wastewater is provided to the collecting unit from a wastewater source. The wastewater is dosed in the collecting unit by adding a compound to the wastewater in an amount that is sufficient to cause the PFAS to separate from the water and to form a sludge. The sludge is then provided to the dewatering unit at a first dryness level having a first percent solids and is then dewatered. The dewatered sludge is then provided to the drying unit at a second dryness level having a second percent solids that is higher than the first percent solids and is then dried. Lastly, the dried sludge is provided to the baking unit at a third dryness level having a third percent solids that is higher than the second percent solids and is baked. More particularly, the sludge is baked at a sufficiently high enough temperature that chemical bonds of at least a portion of the PFAS is destroyed.

In certain embodiments, the first dryness level is between approximately 1% solids and approximately 5% solids, the second dryness level is between approximately 15% solids and approximately 25% solids, and/or the third dryness level is approximately 80% solids to approximately 90% solids. In certain embodiments, the sludge is heated to between approximately 200° C. to approximately 1600° C. in the baking unit. In certain embodiments, the sludge is heated to a minimum of 954° C. (1,750° F.) in the baking unit. In certain embodiments, the sludge is baked using a pyrolysis process. In certain embodiments, the sludge is baked using a gasification process. In certain embodiments, the method is carbon negative. In certain embodiments, the wastewater treatment system operates in a batch mode of operation. In other embodiments, the wastewater treatment system operates in a continuous mode of operation. In certain preferred embodiments, the wastewater remediation method is carried out entirely without the use of petroleum or fuel oils or other petroleum products.

In certain embodiments, the wastewater treatment system includes a heat regenerating unit, and the drying unit, the baking unit, and the heat regenerating unit form a closed loop that is configured to prevent gas from escaping the closed loop. Additionally, the method includes the step of using the heat regenerating unit to generate electricity from waste heat generated when the sludge is heated that is circulated through at least a portion of the closed loop. In certain embodiments, the collecting unit comprises an aeration basin or mixing chamber. The method may include the step of adding a precipitating mineral compound to the wastewater in the aeration basin or mixing chamber in order to separate the PFAS from the water. The precipitating compound may include at least one of calcium carbonate, magnesium carbonate, lanthanum chloride, or chitosan. In certain embodiments, a biological compound is added to the wastewater and organic matter in the wastewater is digested with the biological compound. In certain embodiments, digester gas is produced by the digestion of the organic matter, and the digester gas is burned during the baking step within the wastewater treatment system such that the PFAS are destroyed.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein:

The FIGURE is a diagram illustrating a wastewater treatment system that may be used for remediating wastewater formed by water and per- and poly-fluoroalkyl substances (PFAS) according to an embodiment of the present invention.

DETAILED DESCRIPTION

Referring now to the drawings in which like reference characters designate like or corresponding characters throughout the several views, there is shown in the FIGURE a diagrammatic view of a wastewater treatment system 100 that may be used in remediating wastewater formed by water and per- and poly-fluoroalkyl substances (PFAS), according to a preferred method of the present invention.

A first step in a preferred method is to provide wastewater treatment system 100. In preferred embodiments, the system 100 includes an open-air aeration basin, an enclosed mixing chamber, or other similar clarifying devices (referred to generally as collecting unit 102), a drying unit 104 that preferably includes a dehumidification or dewatering unit 106 and a dryer unit 108, and then a baking unit 110. Certain preferred embodiments of the wastewater treatment system 100 further include heat regenerating unit 112. Each of these components and their function in the presently disclosed methods is described in further detail below.

In the illustrated embodiment, the collecting unit 102 is formed by several components. The overall purpose of the collecting unit 102 is to collect wastewater having PFAS, to form a sludge of the PFAS, to begin separating the sludge from the water, and to begin drying the sludge. Initially, wastewater is provided to the collecting unit 102 from a wastewater source. In preferred embodiments, wastewater is provided to a sedimentation unit or primary clarifying unit 114, where the largest and heaviest particles settle out of the wastewater. From there, the wastewater preferably flows over a weir (not shown) of the primary clarifying unit 114 and is sent to a reaction unit 116, such as an open-air aeration basin or an enclosed mixing chamber.

Within the reaction unit 116, the wastewater is dosed with a compound, such as a mineral compound, in an amount that causes the PFAS to coagulate, precipitate, to flocculate, or otherwise separate from the water to form a sludge. In certain embodiments, two or more different compounds are added to the wastewater in order to promote separation of PFAS from water. Suitable compounds are described in U.S. Pat. No. 7,384,573, entitled "Compositions for Wastewater Treatment," which is hereby incorporated by reference in its entirety. As described in the '573 patent, in certain embodiments, a suitable compound for dosing the wastewater might include at least one of calcium carbonate, magnesium carbonate, lanthanum chloride, or chitosan. In certain embodiments, the compound added to wastewater is a precipitating mineral compound that results in precipitation of PFAS.

The dosing step allows the water and sludge to be separated from one another in a subsequent clarification or filtration process. The speed of separation and the quality of the aggregates that form the sludge are central to the effectiveness of the treatment process, not only because they impact the removal of the impurities from the water, but also because they impact the characteristics (e.g. quantity, volume, compactness and water content) of the sludge formed and that is subsequently treated. In dosing the wastewater, it is important to add the minimum amount of chemicals possible and to obtain good contact with all of the wastewater in order to reduce costs, to maximize efficiency of the treatment process, and to minimize the amount of sludge. In certain embodiments, a biological treatment process, such as an activated sludge process or a trickling filter process, is used to assist in purifying the sludge using microorganisms to digest organic matter in the wastewater and to reduce the overall amount of sludge that must be treated.

Next, the sludge may be further purified in a settling tank or secondary clarifying unit 118. Preferably, at this point in the process, PFAS has been substantially removed from a large portion of the water. That portion of the water that is free of PFAS may then be passed for further treatment, such as in a disinfecting unit 120, prior to being discharged from the system 100. However, if needed, the water may be recycled back through a portion of the system 100, such through the reaction unit 116, or through a different portion of the system, such as a sand filtration unit 122, for further treatment in order to further remove PFAS (or other impurities) from the water. Again, if the water from the sand filtration unit 122 is sufficiently pure and free of contaminants and PFAS, it may be discharged from the system 100. At the same time, sludge collected in the secondary clarifying unit 118 is optionally, though preferably, transferred to a settling tank or thickener unit 124, where it is further separated from water.

Another optional step is that sludge from the sand filtration unit 122 and thickener unit 124 may then be sent to a digester unit 126 for anaerobic digestion. The presently-disclosed methods may be used with digested or undigested sludge. When a digestion step is employed, digester gas is produced and that digester gas is likely to be contaminated with PFAS. It is believed that this PFAS-contaminated digester gas could cause the same type of health issues mentioned above, if left untreated. As discussed further below, one such treatment method is to expose the gas to sufficiently high enough temperatures (e.g., incineration) that the chemical bonds that form the PFAS are destroyed such that the PFAS is rendered safe. In preferred embodiments, the digester gas is captured and treated prior to release. As discussed above, during digestion, microorganisms digest organic matter in the sludge. This digestion step helps to provide increased stability of biosolids for later use in land application. Another benefit of the digestion process is that it reduces the overall volume of sludge that must be treated. In preferred embodiments, gases produced by the digestion of the organic matter in digester unit 126 are sent to the baking unit 110 and are burned in order to destroy PFAS that might be found in those gases.

The sludge is then sent or pumped (pump not shown) to the drying unit 104 for further drying and water removal. The drying unit 104 is shown as including both the dewatering unit 106 and the drying unit 108. In some embodiments, the drying unit 104 is formed as a single machine that provides both operations. In other embodiments, separate machines carry out the dewatering and drying processes.

The sludge is first provided to the dewatering unit 106. It is noted here that sludge may bypass the digester unit 126 discussed above and may be, instead, sent directly to the drying unit 104/dewatering unit 106 from the reaction unit 116 or secondary clarifying unit 118 if sufficiently dry. There are a number of dewatering methods and apparatuses that are known in the art that would be well suited for further drying the sludge. For example, dewatering unit 106 could include a centrifuge, belt press, spiral filter press, and the like. In preferred embodiments, the sludge is provided to the dewatering unit 106 at a first dryness level having a first percent solids of between approximately 1% solids and approximately 5% solids. In the illustrated embodiment, sludge having a first dryness level of approximately 3% solids is provided to the dewatering unit 106. Using the dewatering unit 106, the sludge is further dried. Filtrate water from the dewatering process is pumped to the headworks (i.e., the initial stages) of the wastewater treatment system 100. In certain embodiments, this filtrate water may first be pumped to and temporarily held in a raw water unit 128 prior to being sent to the headworks.

Once the sludge is sufficiently dewatered by the dewatering unit 106, it may then be sent to the drying unit 108 for yet additional drying and removal of water. In preferred embodiments, up until this point in the remediation process, water has been removed from the sludge using mechanical means and did not heat the sludge to evaporate water. At this point, the dewatered sludge, which is more of a semi-solid "cake" at this point in the process, can be transported without concern of contamination of PFAS into the environment. However, it is believed that, if the sludge is heated and the remaining water is evaporated in an open system, the water vapor could carry PFAS into the environment. This should be avoided in order to limit the negative health consequences discussed above. If the cake is not heated to a temperature to release the remaining moisture from the cell structure, the cake can be stored in a silo (not shown) prior to further drying.

The next step in the remediation process is to dry the cake through the application of heat. For the reasons discussed above, this drying process is preferably carried out in a closed system such that the water vapor released during the drying process is trapped and PFAS carried by the water vapor is not allowed to contaminate the environment. Thus, the drying process is preferably carried out in a drying unit 108 that includes a closed cabinet or other similar closed environment. In preferred embodiments, the sludge is provided to the drying unit 108 at a second dryness level that is higher than the first dryness level. For example, sludge is preferably provided to the drying unit 108 with a second dryness level having a second percent solids between approximately 15% solids and approximately 25% solids. For example, in the illustrated embodiment, sludge is provided from the dewatering unit 106 to the drying unit 108 at a second dryness level of 20% solids.

Using the drying unit 108, the sludge is further dried. In certain embodiments, the sludge is dried to approximately 500° C. to 600° C. Heat for the drying process can be provided by a variety of sources, including any type of fuel or energy type or source (e.g., renewable or non-renewable), waste heat from the remediation process (as described further below), etc. However, in preferred embodiments, the entire remediation process is carried out without the use of petroleum or fuel oils or other petroleum products. As mentioned above, the water vapor produced during the baking process should be captured and filtered for PFAS. For example, the water vapor might be pumped to the headworks of the wastewater treatment system 100 or to a raw water unit 128 and then to the headworks. The filtered, clean water from the drying process may then be discharged from the system 100.

Lastly, the dewatered and dried cake or sludge is provided to the baking unit 110, where it is burned. Preferably, the dried cake is provided to the baking unit 110 at a third dryness level having a third percent solids of approximately 80% solids to approximately 90% solids. In certain preferred embodiments, a gasification process or a pyrolysis process using plasma is utilized to burn the dried cake. Additionally, in certain embodiments, the burning process is controlled using a plasma magnetic field. The temperatures achieved during the burning process should be sufficiently high to destroy at least a portion of the chemical bonds of the PFAS. In preferred embodiments, the PFAS is broken down by the burning process and rendered inert. The precise temperature will vary, depending on the nature of the PFAS in the wastewater. For example, in various embodiments, the dried cake may require baking to approximately 200° C. to 1000° C., to approximately 1200° C., or even to approximately 1600° C. In certain embodiments, the sludge is heated to a minimum of 954° C. (1,750° F.) in the baking unit 110.

The system 100, including each of its various major components, are preferably configured to operate in batch or continuous (e.g., 24-hour) modes of operation. Additionally, as noted above, the entire remediation process is preferably carried out without the use of petroleum or fuel oils or other petroleum products. In certain embodiments, the remediation process is carbon neutral, which means that any $CO_2$ released into the atmosphere during the remediation process is balanced by an equivalent amount of $CO_2$ being removed from the environment. In preferred embodiments, the remediation process is carbon negative, which means that more $CO_2$ is removed from the environment during the process than is released to the atmosphere during the process.

In certain preferred embodiments, the drying unit 108, the baking unit 110, and the heat regenerating unit 112 form a closed loop that is configured to prevent gas from escaping the closed loop. To improve the energy efficiency of the remediation process, waste heat from the baking process is preferably recycled through the closed loop or to another area of the remediation process (e.g., digester unit, 126, drying unit 108, etc.) or to generate electricity. In addition to improved efficiency, another advantage of this closed loop system is that there are no odor issues when using a closed loop system.

Thus, advantageously, the present disclosure provides various methods for remediating wastewater that is contaminated with PFAS and for rending the harmful PFAS compounds inert. The table below provides experimental data where these methods were used to remove PFAS compounds. The numbers provided are parts per trillion. As can be seen, in each case, these methods result in a significant percentage of the PFAS compounds being removed (e.g., between 58% and 100% removal).

| PFAS COMPOUND | PRE-TREATMENT CONCENTRATION (ppt) | POST-TREATMENT CONCENTRATION (ppt) | % REMOVED |
|---|---|---|---|
| PFPeA | 126.7 | 53.8 | 58% |
| PFHxA | 2568.06 | 60.6 | 98% |
| PFHpA | 793.95 | 16.6 | 98% |
| PFOA | 2478.9 | 49.8 | 98% |
| PFNA | 142.08 | 1.5 | 99% |
| PFDA | 107.37 | 2.06 | 98% |
| PFBS | 4016.62 | 42.3 | 99% |
| PFPeS | 122.93 | 1.72 | 99% |
| PFHxS | 264.96 | 12.4 | 95% |
| PFOS | 240.79 | 14.7 | 94% |
| 4:2 FTS | 125.54 | 1.11 | 99% |
| 8:2 FTS | 28.11 | ND | 100% |
| PFOSA | 104.05 | ND | 100% |
| N-MeFOSAA | 109.93 | 6.78 | 58% |
| N-EtFosaa | 123.68 | 3.49 | 58% |

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. A method for remediating wastewater formed by water and per- and poly-fluoroalkyl substances (PFAS) using a wastewater treatment system, the method comprising the steps of:
    providing said wastewater treatment system, the wastewater treatment system including a collecting unit, a dewatering unit, a drying unit, and a baking unit;
    from a wastewater source, providing said wastewater to the collecting unit;
    dosing the wastewater in the collecting unit by adding a compound to the wastewater in an amount that is sufficient to cause the PFAS to separate from the water and to form a sludge;
    from the collecting unit, providing the sludge to the dewatering unit at a first dryness level having a first percent solids;
    dewatering the sludge with the dewatering unit;
    from the dewatering unit, providing the dewatered sludge to the drying unit at a second dryness level having a second percent solids, wherein the second percent solids is higher than the first percent solids;
    drying the sludge with the drying unit;
    from the drying unit, providing the dried sludge to the baking unit at a third dryness level having a third percent solids, wherein the third percent solids is higher than the second percent solids;
    baking the sludge with the baking unit at a temperature that is between a minimum of 954° C. (1750° F.) to approximately 1600° C. (2912° F.) such that chemical bonds of at least a portion of the PFAS are destroyed.

2. The method of claim 1 wherein the first dryness level is between approximately 1% solids and approximately 5% solids.

3. The method of claim 2 wherein the second dryness level is between approximately 15% solids and approximately 25% solids.

4. The method of claim 3 wherein the third dryness level is approximately 80% solids to approximately 90% solids.

5. The method of claim 1 wherein the second dryness level is between approximately 15% solids and approximately 25% solids.

6. The method of claim 1 wherein the third dryness level is approximately 80% solids to approximately 90% solids.

7. The method of claim 1 wherein the sludge is baked using a pyrolysis process.

8. The method of claim 1 wherein the sludge is baked using a gasification process.

9. The method of claim 1 wherein the method is carbon negative.

10. The method of claim 1 further comprising the step of providing a heat regenerating unit, wherein the drying unit, the baking unit, and the heat regenerating unit form a closed loop that is configured to prevent gas from escaping the closed loop, the method comprising the step of using the heat regenerating unit to generate electricity from waste heat generated when the sludge is baked and when the waste heat is circulated through at least a portion of the closed loop.

11. The method of claim 1 wherein the collecting unit comprises an aeration basin or mixing chamber.

12. The method of claim 11 further comprising the step of adding the compound to the wastewater in the aeration basin or mixing chamber in order to separate the PFAS from the water.

13. The method of claim 12 wherein the precipitating compound is comprised of at least one of calcium carbonate, magnesium carbonate, lanthanum chloride, or chitosan.

14. The method of claim 1 wherein the method is carried out in a batch mode of operation.

15. The method of claim 1 wherein the method is carried out in a continuous mode of operation.

16. The method of claim 1 further comprising the steps of adding a biological compound to the wastewater and digesting organic matter in the wastewater with the biological compound.

17. The method of claim 16 wherein digester gas is produced by the digestion of the organic matter, wherein the digester gas is burned during the baking step within the wastewater treatment system such that the PFAS are destroyed.

18. The method of claim 1 wherein the wastewater remediation method is carried out entirely without the use of petroleum or fuel oils or other petroleum products as an energy source.

* * * * *